(12) United States Patent
Altman et al.

(10) Patent No.: US 6,366,892 B1
(45) Date of Patent: Apr. 2, 2002

(54) METHOD AND SYSTEM FOR AUTOMATICALLY PRODUCING LOAN DOCUMENTS

(75) Inventors: Charles J. Altman, New Rochelle, NY (US); James C. Perkins, Sheffield, VT (US)

(73) Assignee: Titan Film Capitol LLC., New York, NY (US)

( * ) Notice: Subject to any disclaimer, the term of this patent is extended or adjusted under 35 U.S.C. 154(b) by 0 days.

(21) Appl. No.: 09/543,700

(22) Filed: Apr. 5, 2000

(51) Int. Cl.⁷ .................. G06F 17/60; G06F 15/163
(52) U.S. Cl. ............................................. 705/38
(58) Field of Search ......................... 705/38; 364/408

(56) References Cited

U.S. PATENT DOCUMENTS

| | | | | |
|---|---|---|---|---|
| 5,239,462 A | * | 8/1993 | Jones | 364/408 |
| 5,262,941 A | * | 11/1993 | Saladin | 364/408 |
| 5,699,527 A | * | 12/1997 | Davidson | 364/408 |
| 5,774,882 A | * | 6/1998 | Keen | 705/38 |
| 5,842,178 A | | 11/1998 | Giovannoli | |
| 5,870,721 A | * | 2/1999 | Norris | 705/38 |
| 5,878,403 A | * | 3/1999 | DeFrancesco | 705/38 |
| 5,930,776 A | | 7/1999 | Dykstra et al. | |
| 5,940,812 A | | 8/1999 | Tengel et al. | |
| 5,966,699 A | | 10/1999 | Zandi | |
| 5,983,206 A | | 11/1999 | Oppenheimer | |
| 5,991,745 A | | 11/1999 | Kiritz | |
| 5,995,947 A | | 11/1999 | Fraser et al. | |
| 6,006,207 A | | 12/1999 | Mumick et al. | |
| 6,029,149 A | * | 2/2000 | Dykstra | 705/38 |
| 6,088,686 A | * | 7/2000 | Walker | 705/38 |
| 6,112,190 A | * | 8/2000 | Fletcher | 705/38 |

FOREIGN PATENT DOCUMENTS

| | | | |
|---|---|---|---|
| WO | WO00/31660 | * 6/2000 | G06F/17/27 |

OTHER PUBLICATIONS

Figes, Mike—Forbes Supplement pp 117–118 Aug. 29,1994.*

* cited by examiner

*Primary Examiner*—Vincent Millin
*Assistant Examiner*—Geoffrey Akers
(74) *Attorney, Agent, or Firm*—Notaro & Michalos P.C.

(57) ABSTRACT

A method for automating legal documents particularly for institutional and commercial loans includes the steps of providing in a database a plurality of provisions, including a plurality of standard clauses for each provision, and at least one optional clause associated with each standard clause, and a lender ranking value for each optional clause; selecting either the standard clause or the associated optional clause for each provision; allocating a borrower ranking value to each selected optional clause; comparing the associated lender ranking value to the borrower ranking value for each selected optional clause for determining which of the standard clauses will be retained and which of the selected optional clauses associated with the standard clause will be accepted to replace the standard clause; and generating a loan document having each of the accepted selected optional clauses and each of the retained standard clauses.

16 Claims, 2 Drawing Sheets

METHOD AND SYSTEM FOR AUTOMATICALLY PRODUCING LOAN DOCUMENTS

FIELD OF THE INVENTION

The present invention relates generally to the automatic generation of legal documents and, more particularly, to the automatic generation of legal documents for institutional and commercial loans.

BACKGROUND OF THE INVENTION

Commercial loan documents contain many contract provisions. Each provision can contain several variables. A provision requiring a borrower to maintain casualty insurance coverage, for example, may include monetary thresholds as well as clauses providing for how the distribution of the insurance proceeds will occur in the event of a casualty. A standard clause included in a lender's loan document might provide that, in the event of a casualty covered by the insurance policy, the proceeds are to be paid to the lender who then disburses the proceeds to contractors who are rebuilding a structure, i.e., the collateral for a loan. An alternative version of the insurance provision could provide that the proceeds will be paid to the borrower for the borrower to disburse to the contractors.

In accordance with existing techniques, if a borrower does not wish to accept a standard clause, the borrower or borrower's counsel typically communicates with the lender or lender's counsel and requests changes to the loan documents. If the lender is willing to make the changes, the lender's counsel or the borrower's counsel proposes new terms modifying or replacing the standard clause. The process may be repeated several times. The same process is often repeated for numerous other provisions. Because of the human interaction that is involved, the time spent in the negotiation and drafting of the loan documents may be appreciable and the process can result in significant legal fees.

Lenders typically analyze and price institutional and commercial loans based upon their standard loan documents before negotiations over the loan documents begin in earnest. Lenders do not generally re-price the loans based upon these subsequent negotiations.

Therefore, extended loan negotiations, involving numerous contractual changes, can adversely impact the lender's profit margin. The lender may be less prone to negotiate changes, or may raise the original charge for all loans, to account for such back-end costs, thereby, raising the borrower's costs.

Some provisions in loan documents may have a lesser importance to the lender than other provisions. Although willing to modify or remove the less important provision, a lender may use the provision as a "bargaining chip" for retaining provisions which are more favorable and significant to the lender. This also results in expenditure of time and incurs legal expenses relating to the negotiation of provisions that may not be as important to the parties as other provisions.

An effective automatic method of loan negotiation and loan document generation, therefore, is very desirable. Some automated processing systems are found in pre-existing prior art.

A computerized system for matching potential borrowers with available loans, for example, is disclosed in U.S. Pat. 5,940,812. The system matches available loans to potential borrowers and automatically generates a loan application form via the global telecommunications network, e.g. the Internet. The attributes of the available loans are pre-specified by the lender. A borrower, using the system, disclosed in the patent, must enter data corresponding to pre-specified designations of borrower attributes.

U.S. Pat. No. 5,995,947 discloses a method for trading loans in real time by placing loan applications up for bid by a plurality of potential lenders.

U.S. Pat. No. 5,966,699 relates to a computer system for conducting an electronic loan auction over a computer network.

U.S. Pat. No. 5,930,776 discloses a computer automated system for automatically evaluating a potential borrower's credit and processing the loan application.

SUMMARY OF THE INVENTION

In accordance with the present invention, a method and system is provided for automatically generating customized legal documents, particularly for institutional commercial loans, from a database of loan provisions including standard clauses and alternate optional clauses for each of the standard clauses.

According to one aspect of the invention, the prospective borrower selects either standard clause or from one or more optional clauses for different loan provisions.

In a preferred embodiment of the invention, a value is assigned to each of the optional clauses and the cost of the loan is determined and based on the clauses selected by the prospective borrower.

The inventive method preferably utilizes a computerized data processing system with a database of loan provisions. The loan provisions include standard clauses and one or more optional clauses associated with each one of the standard clauses. Each optional clause has an associated lender ranking value. A borrower selects either the standard clause or one of the associated optional clauses for each of the negotiable loan provisions. The borrower assigns a borrower ranking value to each selected optional clause. The borrower ranking value is then compared with an associated lender ranking value for each selected optional clause for determining whether the standard clauses will be retained or replaced by the selected optional clauses. The selected optional clauses having an assigned borrower ranking value which equals or exceeds the lender ranking value will replace the associated standard clause. If the lender ranking value exceeds the borrower ranking value, the standard clause is retained. The loan document is then generated with loan provisions composed of each of the accepted selected optional clauses and each of the retained standard clauses.

It is thus an object of the present invention to provide a method and system for automatically generating legal documents for loan transactions which incorporate desired provisions and eliminate substantial time and cost in negotiating and drafting the loan documents.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
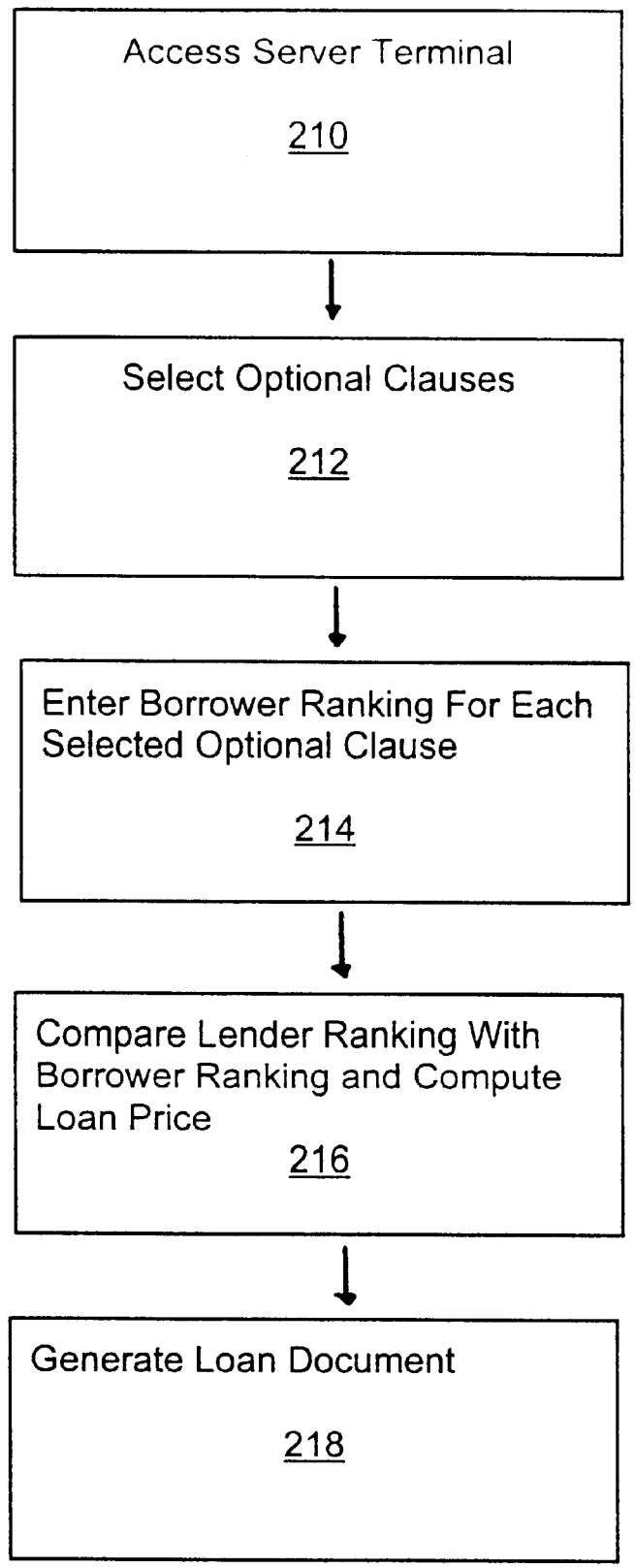
FIG. 1 is a block diagram of the steps of the present invention.

In accordance with the present invention, a prospective borrower selects from a predesignated list of negotiable loan provisions, a standard clause for each loan provision or an optional clause associated with each standard clause. A borrower ranking value is allocated to each selected optional clause. The borrower ranking value is compared with a lender ranking threshold assigned to each optional clause. If the borrower ranking value meets or is greater than the lender ranking threshold, the selected optional clause is accepted and replaces the standard clause in the legal document. If the borrower ranking value does not meet or exceed the lender ranking threshold, the standard clause is retained. A loan document including the accepted optional clauses and the retained standard clauses is automatically generated.

A loan price is automatically computed based on values assigned to each standard and accepted optional clause.

The automated loan document system of the present invention utilizes a server, lender terminals, and borrower terminals. The server and lender terminal can be coupled using multiple access methods, including a local or wide area network, Intranet, Internet, leased communication lines or dial-up telephone lines, or some combination thereof. The borrower terminal is not necessarily hard-wired to the server. The server can be accessed by borrower terminal through the Internet, leased communication lines or dial-up telephone lines, or some combination thereof.

Server

A server includes a database and a data processor operating under control of an operating system and application software. The server responds to messages from the lender terminals and the borrower terminals. The data processor may comprise a microprocessor, for example, an Intel Pentium processor, a mini-computer or mainframe processor.

The server enters loan provision profiles into the database in response to communications from the lender terminals, accepts borrower information from the borrower terminals, compares the loan provision profiles with the borrower information and sends information based on the comparison to a document assembly module for automatic generation of loan applications and loan documents.

The database stores and segregates into text blocks loan provisions and standard clauses and optional clauses for each loan provision. The database also stores into text blocks the loan provision profiles entered from the lender terminals. Each loan provision profile preferably contains at least a plurality of negotiable loan provisions, including a plurality of standard clauses for each negotiable provision and optional clauses associated with each standard clause, and a lender ranking value and a lender price assigned to each optional clause. The negotiable provisions are provisions in a loan document which have been pre-designated and selected by a lender for negotiation. The number, type and substance of the provisions which can be used by the system are virtually limitless. As used herein, the term "lender" includes any person or entity fulfilling a role as a loan maker, not necessarily an actual lending institution or officer thereof.

The borrower selects optional clauses to replace each associated standard clause in the loan document and assigns a borrower ranking value for each selected optional clause. As used herein, the term "borrower" includes any person or entity fulfilling a role as a borrower of a loan or a representative of a borrower. For example, the borrower terminals could be used directly by a mortgage broker, a mortgage banker or an attorney representing the borrower.

The server, in a preferred embodiment of the invention, includes a set of program modules. Each module is a set of software objects and/or program elements, collectively having the ability to execute independently in a separate thread or logical chain of process execution. Each module can be executed as a separate logical server or using a separate physical device.

The server preferably includes a login module, a borrower module, a lender module, a notification module and a document assembly module. The login module is responsible for password checking, access control, and assignment of a particular program module to service the client.

The borrower module handles all server-side application requirements of the borrower terminal. The lender module handles all server-side application requirements of the lender terminal. The notification module handles notification and electronic mail communication with the borrower terminals and the lender terminals. The document assembly module includes a collection of data objects and program elements for importing data and assembling, e-mailing and printing loan applications and loan documents based on such data.

Borrower Terminal

Each of the borrower terminals comprises a device or set of devices coupled to the server, such as a general purpose processor operating under control of operating system and application software, and disposed to enter and process information, as described herein. In a preferred embodiment, one of the borrower terminals can comprise a PC workstation such as an Intel Pentium processor operating under control of the Microsoft Windows 98 operating system.

The borrower terminal includes information input devices, such as a keyboard and mouse or other pointing device, and information output and presentation devices, such as a monitor and printer.

A prospective borrower uses the borrower terminal to access from the server the negotiable provisions, standard clauses and optional clauses for each available loan, to transmit requests for replacing standard clauses with selected optional clauses and a borrower ranking value for each selected optional clause to the server, to review the status of those requests as they are processed by the server, to receive by e-mail the loan applications composed of the selected optional clauses and/or standard clauses and to accept or decline the loan applications.

The borrower cannot access the server without entering an authorized code or password. Prior to the implementation of the document automation system, the borrower has already been approved for a loan and has met the lender's criteria for borrowers.

Lender Terminal

Each of the lender terminals comprises a device or set of devices coupled to the server terminal, such as a general purpose processor operating under control of operating system and application software. In a further preferred embodiment, one of the lender stations can comprise a PC workstation such as an Intel Pentium processor operating under control of the Microsoft Windows 98 operating system.

The lender terminal includes information input devices, such as a keyboard and mouse or other pointing device, and information output and presentation devices, such as a monitor and printer.

A lender uses the lender station to transmit loan provision profiles to the server terminal, valuation and cash flow information relating to the loan collateral and economic loan terms, to be notified when their quotes are accepted and to receive automated loan applications and documents.

Referring to the drawings, FIG. 1 shows a process flow diagram of operation of an automated loan document system.

A method 200 of operation of the system includes a plurality of steps as described herein.

At step 210, a prospective borrower at the borrower terminal logs into the server which verifies that the borrower is authorized to access the system. In this step, the server transmits any access control data or other data needed to initialize the borrower terminal so as to customize it for access by the borrower.

After accessing the server terminal, a table of negotiable provisions, and standard clauses and optional clauses for each associated standard clause are displayed on the borrower's monitor screen. The borrower can obtain specific information about each negotiable provision and optional clause by using a computer mouse and cursor to select a particular negotiable provision or optional clause.

At step 212, the borrower either accepts the standard clause of the negotiable provision or selects the associated optional clause to replace the standard clause.

At step 214, the prospective borrower enters a ranking value to each of the selected optional clauses. The table which is displayed on the borrower's monitor screen has spaces for entering the ranking value for each of the optional clauses. The optional clauses are ranked by allocating tokens to each selected clause. A specified number of negotiating tokens, e.g., fifty, is provided for allocating among the selected optional clauses. The optional clause of most importance to the borrower would be allotted the greatest number of tokens. The sum of the ranking values cannot exceed the specified number of tokens.

The borrower transmits the requests to replace the standard clause with the selected optional clause and the ranking values of each selected optional clause to the server terminal.

At step 216, the data processor of the server compares the ranking value of the lender with the ranking value of the borrower given to each of the selected optional clauses for determining which of the standard clauses will be retained and which of the selected optional clauses associated with the standard clause will be accepted to replace the standard clause.

If the borrower ranking value for an optional clause is less than the lender ranking value, the negotiable provision is not modified and the standard clause will be used in the loan document. On the other hand, if the borrower ranking value is equal or greater than the lender ranking value, then the optional clause will be considered accepted by the lender by the system and will replace the standard clause in the loan document.

The processor computes the loan price based on the prices for each accepted optional clause.

At step 218, the server submits the comparison results and loan price to the automated document assembly module which automatically generates the loan application based on the accepted optional clauses. The loan application and loan price is transmitted to the borrower terminal where the borrower can either accept or decline the loan.

After the loan application is accepted, a loan document is generated by the automated document assembly module and transmitted, preferably by e-mail, to the lender or its representative for review. The loan document contains the provisions in the loan application except that the provisions in the loan document are stated in more detail.

If the borrower does not accept the loan application or if none of the selected optional clauses are accepted, the system will allow the borrower a limited number of chances to select new optional clauses or re-enter new ranking values for the selected optional clauses. The lender ranking value for a selected optional clause cannot be accessed by the borrower during any time during the inventive method.

Table 1 represents the information generated by the system after the borrower's selection of optional clauses and borrower ranking values have been processed. The generated information, as shown in Table 1, is sent to the automated document assembly module for automating the generation of the loan applications and loan documents.

TABLE 1

| Negotiable Provision by Borrower | Provision Option Chosen by Borrower | Tokens Allocated by Borrower | Lender Ranking Threshold | Lender Assigned Price | Has Borrower met Threshold? | Change in Loan Price |
|---|---|---|---|---|---|---|
| Insurance Coverage | B | 6 | 10 | Interest rate increase of 20 basis points | NO | NA |
| Lease Approval | C | 8 | 4 | Interest rate increase of 10 basis points | YES | +10 basis points |
| Recourse Carveouts | B | 8 | 10 | Interest rate increase of 25 basis points | NO | NA |
| Financial Reporting Requirements | B | 10 | 5 | Interest rate increase of 4 basis points | YES | +4 basis points |
| Prepayment Option | D | 18 | 15 | Interest rate increase of 15 basis points | YES | +15 basis points |
| Notice of Default Time Periods | C | NA | NA | Interest rate decrease of 5 basis points | YES | −5 basis points |
| TOTAL | | 50 | | | | +24 basis points |

The "Total" row of Table 1 indicates the total "Tokens Allocated By Borrower" and the "Change in Loan Price"

based on the selection of optional clauses by the potential borrower. In this instance, the borrower has been given a total of fifty (50) tokens to allocate among the optional clauses. The "Prepayment Option" negotiable provision has been allocated the most number of tokens, eighteen (18).

The overall price of the loan will be increased by twenty-four (24) basis points based on the optional clauses selected by the borrower and accepted by the lender to replace each respective standard clause.

With respect to the "Insurance Coverage" negotiable provision, the potential borrower has requested that the Option "B" optional clause replace the standard clause of said provision in the loan document. The potential borrower has allotted six (6) tokens to this optional clause while the lender as assigned ranking of ten (10) to the same clause. As can be seen from the "Has Borrower Met Threshold?" column, the potential borrower in this instance has not met the lender's threshold. Therefore, the standard clause of the "Insurance Coverage" negotiable provision will be used in the loan document.

The "Change In Loan Price" column illustrates the price of each optional clause selected by the potential borrower that satisfies the lender's threshold ranking. As reflected for the "Notice of Default Time Periods" negotiable provision, the borrower is given a credit of "–5 basis points" for selecting the particular optional clause.

Figure 2:
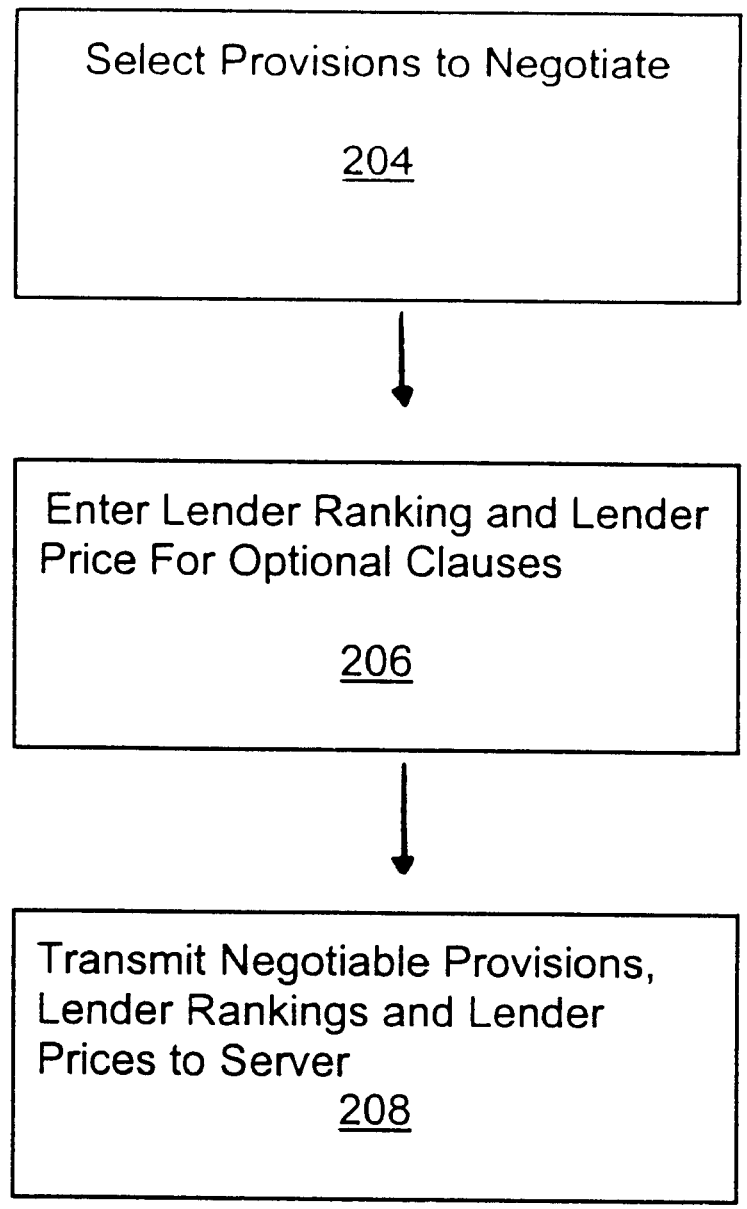
FIG. 2 is a block diagram of another embodiment of the present invention.

In another embodiment, as shown in FIG. 2, the method may also include the steps of entering the loan provision profile into the database. The lender at the lender terminal accesses the server terminal. After accessing the server, a list of provisions for the loan applications and loan documents, standard clauses for the provisions and optional clauses associated with each standard clause are displayed on the lender terminal screen. At step 204, the lender selects the provisions which are negotiable and then indicates whether the negotiable provision (i) can be eliminated in its entirety or (ii) replaced with an optional clause. The lender then selects at least one optional clause for each provision selected for negotiation.

At step 206, the lender enters a numeric threshold ranking and a price for each selected optional clause. A higher ranking signifies a greater significance that the optional clause has to the lender. The lender ranking entered for each selected optional clause cannot exceed the total number of tokens provided to a prospective borrower. Should the entered lender ranking for a selected optional clause exceed the total number of tokens, the server automatically requests the lender to enter a lower ranking value.

The price of the optional clause can be expressed as an increase in the interest rate of the loan or as a flat fee that the borrower would pay. The flat fee can be a percentage of the loan amount, i.e., points. The lender may also assign a credit to a prospective borrower who selects a optional clause which is more restrictive than the standard clause to the borrower.

In a preferred embodiment, the lender assigns a price to the optional clause in the form of additional basis points to the interest rate and a flat monetary fee. The system automatically computes the annual loan payment based on the interest rate with any additional basis points and the lender's proposed amortization schedule for the loan. If annual loan payment would exceed the maximum loan payment that the collateral can support based upon the lender's debt service coverage ratios for the loan then the system automatically replaces the basis point increase with the pre-determined flat fee as the selected optional clause price.

A grid, as shown in Table 2 below, is displayed on the lender terminal screen for entering loan provision file information.

TABLE 2

| Negotiable Provision | Provision Options | Lender Ranking Threshold | Lender Assigned Price |
|---|---|---|---|
| Insurance Coverage | Option A - (standard) insurance proceeds disbursed to lender | NA | NA |
|  | Option B - proceeds disbursed to borrower | 10 | Interest rate increase of 20 basis points |
| Lease Approval | Option A - all new leases must be approved by lender | NA | Interest rate decrease of 5 basis points |
|  | Option B - (standard) new leases for space in excess of 5% of rentable sq. ft. must be approved by lender | NA | NA |
|  | Option C - new leases for space in excess of 5% of rentable sq. ft. must be approved by lender, except that if lender does not respond to borrower's request for approval within 5 business days the lease is deemed approved | 4 | Interest rate increase of 10 basis points |
|  | Option D - new leases for space in excess of 10% of rentable sq. ft. must be approved by lender, except that if lender does not respond to borrower's request for approval within 5 business days the lease is deemed approved | 7 | Interest rate increase of 15 basis points |

The "Negotiable Provisions" are identified as "Insurance Coverage" and "Lease Approval." The "Insurance Coverage" negotiable provision includes two provision options—a standard clause ("Option A") and an optional clause ("Option B".) The lender has assigned a "Lender Ranking Threshold" of 10 to provision option "Option B." The "Lender Assigned Price" of "Option B" is "Interest rate increase of 20 basis points." Therefore, if "Option B" is accepted as a clause in the loan document, the interest rate of the loan will be increased by twenty (20) basis points.

The term "NA"—meaning "not applicable"—is displayed in the "Lender Assigned Price" slot for "Option A" which is the standard clause for the "Insurance Coverage" negotiable provision. This means that the selection of Option A will not have any effect on the price of the loan since the total loan price already incorporates the prices of all standard clauses in the loan document.

The "Lease Approval" negotiable provision includes four options—"Option A", "Option B" (standard clause), "Option C" and "Option D". The "Lender Ranking Threshold" and the "Lender Assigned Price" for "Option A" is "NA" and "Interest rate decrease of 5 basis points", respectively. Therefore, if "Option A" is accepted as a clause in the loan document, the interest rate of the loan will be decreased by five (5) basis points because the clause provides greater rights to the lender than provided by the standard clause, i.e., "Option B."

Additional examples of negotiable provisions and associated lender ranking value and lender price are shown in Table 3 below.

TABLE 3

| Negotiable Provision | Provision Options | Lender Ranking Threshold | Lender Assigned Price |
|---|---|---|---|
| Existing Lease Modification and Termination | Option A - No lease modification or termination permitted without Lender approval | NA | Interest rate decrease of 2 basis points |
| | Option B - No lease modification or termination permitted without Lender approval, which shall not be unreasonably withheld, except with respect to leases of less than 5% of rentable area. | NA | NA |
| | Option C - No lease modification or termination permitted without Lender approval except (1) termination of leases of less than 10% of rentable area which are in default and (2) modification of leases made in the ordinary course of business of Borrower which do not affect the rent or term of the lease. | 2 | Interest rate increase of 3 basis points |
| Insurance Requirement | Option A - property insurance deductible not exceeding $10,000 | NA | NA |
| | Option B - property insurance deductible not exceeding 5% of loan balance | 10 | Interest rate increase of 20 basis points |
| Insurance Disbursement | Option A - insurance proceeds disbursed to lender | NA | NA |
| | Option B - proceeds disbursed to borrower for reconstruction | 10 | Interest rate increase of 20 basis points |
| Insurance Settlement of Claims | Option A - Lender must approve settlement of all claims | NA | Interest rate decrease of 5 basis points |
| | Option B - Lender must approve settlement of all claims in excess of 5% of Loan Amount | NA | NA |
| Independent Director | Option A - No independent director required | 7 | Interest rate increase of 10 basis points |
| | Option B - Independent director required | NA | NA |
| Property Manager | Option A - Manager subject to Lender approval | NA | NA |
| | Option B - Manager subject to Lender approval which shall not be unreasonabiy withheld provided the manager operates more than 5,000,000 square feet of similar property | 4 | Interest rate increase of 3 basis points |
| Manager Termination | Option A - Lender may terminate manager if Lender is not satisfied with performance | NA | Interest rate decrease of 5 basis points |
| | Option B - Lender may terminate manager if manager is in material default under management agreement | NA | Interest rate decrease of 3 basis points |
| | Option C - Lender may terminate manager if debt service coverage ratio is less than [1.05 to 1.0] for three consecutive months | NA | NA |
| Financial Reporting Requirements- Time Periods | Option A - Monthly reports due within 15 days; quarterly reports due within 30 days and annual reports due within 45 days | NA | NA |
| | Option B - No Monthly report; Quarterly reports due within 30 days; annual reports due within 90 days | 5 | Interest rate increase of 4 basis points |
| Cash Management | Option A - Hard Lock Box - tenants directed to send rent as directed by Lender; Lender to apply funds in accordance with approved budget | NA | Interest rate decrease of 15 basis points |
| | Option B - Soft Lock Box - property manager deposits receipts into lock account; may withdraw when amount in lock box exceeds monthly debt service payment | NA | Interest rate decrease of 7 basis points |
| | Option C - Default Lock Box - tenants deposit rent in lock box account following default | NA | NA |
| Additional Debt | Option A - none permitted except trade payables | NA | NA |
| | Option B - none permitted except trade payables and indebtedness up to 5% of loan for inventory and equipment | 4 | Interest rate increase of 3 basis points |

In step 208, the lender loan profile which includes the negotiable provisions selected by the lender, the lender ranking value and the price entered for each selected optional clause is transmitted to the server for storage into the database.

After the lender loan profile is entered, a borrower may access the server to perform steps 210–214 and to activate steps 216–218.

While a specific embodiment of the invention has been shown and described in detail to illustrate the application of the principles of the invention, it will be understood that the invention may be embodied otherwise without departing from such principles.

What is claimed is:

1. A method for generating a customized legal document for a sophisticated commercial or business transaction, in a manner that significantly reduces the time, effort and cost of negotiating terms of the legal document, by utilizing a computer system having a database of loan provisions, the loan provisions including a plurality of non-negotiable loan provisions and a plurality of negotiable loan provisions designated for negotiation, the negotiable loan provisions including standard clauses and at least one optional clause associated with each of the standard clauses, each optional clause having a lender ranking threshold, the method comprising the steps of:

(a) selecting the standard clause or the associated optional clause for each of the negotiable loan provisions;

(b) allocating a borrower ranking value to each selected optional clause;

(c) comparing the lender ranking threshold to the borrower ranking value for each selected optional clause for determining which of the standard clauses will be retained in the legal document and which selected optional clause associated with the standard clause will be accepted to replace the standard clause; and (d) generating the legal document having the non-negotiable loan provisions and each of the accepted selected optional clauses and each of the retained standard clauses.

2. A method as claimed in claim 1 further comprising the step of assigning a value to each optional clause, and computing a loan price based on the values assigned to each accepted selected optional clause.

3. A method as claimed in claim 1 further comprising the step of limiting the sum of the borrower ranking values to a specified number so that the borrower ranking value allocated to a single selected optional clause cannot exceed the specified number.

4. A method as claimed in claim 3 wherein the lender ranking threshold for each optional clause is limited to the sum of the borrower ranking values.

5. A method as claimed in claim 1 wherein the selected optional clause replaces the standard clause when the borrower ranking value is equal to or exceeds the lender ranking threshold and the standard clause is retained in the legal document when the lender ranking threshold exceeds the borrower ranking value.

6. A method for generating a customized legal document for a sophisticated commercial or business transaction in a manner that significantly reduces the time, effort and cost of negotiating terms of the legal document, by utilizing a computer terminal, and a borrower terminal connected to the computer terminal, the computer terminal having a database of loan provisions, the loan provisions including a plurality of non-negotiable loan provisions and a plurality of negotiable loan provisions designated for negotiation, the negotiable loan provisions including standard clauses and at least one optional clause associated with each of the standard clauses, each optional clause having a lender ranking threshold, the method comprising the steps of:

(a) receiving at the computer terminal, a selection of the standard clause or the associated optional clause for each negotiable loan provision, and a borrower ranking value allocated to each selected optional clause from the borrower terminal;

(b) comparing the lender ranking threshold to the borrower ranking value for each selected optional clause for determining which of the standard clauses will be retained in the legal document and which of the selected optional clauses associated with the standard clause will be accepted to replace the standard clause; and (c) generating the legal document having the non-negotiable loan provisions and each of the accepted selected optional clauses and each of the retained standard clauses.

7. A method as claimed in claim 6 wherein each optional clause has an assigned value and further comprising the step of computing a loan price based on the values assigned to each accepted optional clause.

8. A method as claimed in claim 6 wherein the selected optional clause replaces the standard clause when the borrower ranking value is equal to or exceeds the lender ranking threshold and the standard clause is retained in the legal document when the lender ranking threshold exceeds the borrower ranking value.

9. A method for generating a customized legal document for a sophisticated commercial or business transaction, in a manner that significantly reduces the time, effort and cost of negotiating terms of the legal document, by utilizing a computer terminal, a lender terminal and a borrower terminal, the lender terminal and the borrower terminal being connected to the computer terminal, the computer terminal having a database of loan provisions, the loan provisions including standard clauses and at least one optional clause associated with each of the standard clauses, the method comprising the steps of:

(a) accessing the computer terminal at the lender terminal;

(b) selecting loan provisions which are negotiable at the lender terminal;

(c) designating at least one optional clause for each negotiable loan provision at the lender terminal;

(d) assigning a lender ranking threshold to each designated optional clause at the lender terminal;

(e) accessing the computer terminal at the borrower terminal;

(f) selecting the standard clause or the associated designated optional clause for each of the negotiable loan provisions at the borrower terminal;

(g) allocating a borrower ranking value to each selected designated optional clause at the borrower terminal;

(h) comparing the lender ranking threshold to the borrower lender value for determining which of the standard clauses will be retained and which of the selected designated optional clauses associated with the standard clause will be accepted to replace the standard clause at the computer terminal; and (i) generating the legal document having the non-negotiable loan provisions and each of the accepted selected optional clauses and each of the retained standard clauses at the computer terminal.

10. A computer system for generating a customized legal document for a sophisticated commercial or business transaction, in a manner that significantly reduces the time, effort and cost of negotiating terms of the legal document, the computer system comprising:

(a) a computer terminal having a database;

(b) a plurality of loan provisions stored in the database, the loan provisions including non-negotiable loan provisions and negotiable loan provisions designated for negotiation, the negotiable loan provisions including standard clauses and at least one optional clause associated with each standard clause, each optional clause having an associated lender ranking threshold;

(c) access means for retrieving the plurality of negotiable loan provisions on a second computer connected to the computer terminal;

(d) selection means for choosing between the standard clause and the associated optional clause and transmitting the selection to the computer terminal;

(e) allocation means for allocating a borrower ranking value to each selected optional clause and transmitting the allocated borrower ranking value to the computer terminal;

(f) comparison means for comparing the lender ranking threshold and the borrower ranking value for determining which of the standard clauses will be retained and which of the selected optional clauses associated with the standard clause will be accepted to replace the standard clause, wherein the selected optional clause replaces the standard clause when the borrower ranking value is equal to or exceeds the lender ranking threshold and the standard clause is retained in the legal document when the lender ranking threshold exceeds the borrower ranking value; and (g) document generating means for creating the legal document including the non-negotiable loan provisions and each of the accepted selected optional clauses and each of the retained standard clauses.

11. A computer system as claimed in claim 10 further comprising a computing means for computing a loan price based on a value assigned to each accepted selected optional clause, the values being stored in the database.

12. A computer system for generating a customized legal document for a sophisticated commercial or business transaction, in a manner that significantly reduces the time, effort and cost of negotiating terms of the legal document, the computer system having a database of a plurality of loan provisions stored in the database, the loan provisions including non-negotiable loan provisions and negotiable loan provisions designated for negotiation, the negotiable loan provisions including standard clauses and at least one optional clause associated with each standard clause, each optional clause having a lender ranking threshold; the computer system allowing a borrower terminal to access the database for selecting either the standard clause or the associated optional clause and assigning a borrower ranking value to the selected optional clause; the computer system receiving the selection of the standard clause or the optional clause for each negotiable loan provision and the borrower ranking value from the borrower terminal; the computer system comparing the lender ranking threshold and the borrower ranking value for determining which of the standard clauses will be retained and which selected optional clauses associated with the standard clause will be accepted to replace the standard clause in the legal document; and the computer system creating the legal document having the non-negotiable provisions and each of the accepted selected optional clauses and each of the retained standard clauses.

13. A computer system as claimed in claim 12 wherein the selected optional clause replaces the standard clause when the borrower ranking value is equal to or exceeds the lender ranking threshold and the standard clause is retained in the legal document when the lender ranking threshold exceeds the borrower ranking value.

14. A computer system as claimed in claim 12 further comprising a computing means for computing a loan price based on a value assigned to each accepted selected optional clause, the values being stored in the database.

15. A computer system for generating a customized legal document for a sophisticated commercial or business transaction, in a manner that significantly reduces the time, effort and cost of negotiating terms of the legal document, the computer system having a database of a plurality of loan provisions stored in the database, the loan provisions including standard clauses and a least one optional clause associated with each standard clause; the computer system being connected to a lender terminal for allowing the lender terminal to access the database for selecting loan provisions which are negotiable, designating at least one optional clause for each negotiable loan provision and assigning a lender ranking threshold to each designated optional clause; the computer system receiving the selection of negotiable loan provisions, the designation of at least one optional clause for each negotiable provision, and the lender ranking threshold for each designated optional clause from the lender terminal; the computer terminal also being connected to a borrower terminal for allowing the borrower terminal to access the database for selecting either the standard clause or the associated designated clause and assigning a borrower ranking value to the selected designated optional clause; the computer system receiving the selection of the standard clause or the designated optional clause for each negotiable loan provision and the borrower ranking value from the borrower terminal; the computer system comparing the lender ranking threshold and the borrower ranking value for determining which of the standard clauses will be retained and which of the selected designated optional clauses associated with the standard clause will be accepted to replace the standard clause in the legal document; and the computer system generating the legal document having the non-negotiable loan provisions and each of the accepted selected designated optional clauses and each of the retained standard clauses.

16. The computer system as claimed in claim 15 wherein the selected designated optional clause replaces the standard clause when the borrower ranking value is equal to or exceeds the lender ranking threshold and the standard clause is retained in the legal document when the lender ranking threshold exceeds the borrower ranking value.

\* \* \* \* \*

UNITED STATES PATENT AND TRADEMARK OFFICE
CERTIFICATE OF CORRECTION

PATENT NO. : 6,366,892 B1
DATED : April 2, 2002
INVENTOR(S) : Charles J. Altman et al.

It is certified that error appears in the above-identified patent and that said Letters Patent is hereby corrected as shown below:

<u>Title page,</u>
Item [73], Assignee: please change "Titan Film Capitol LLC" to read correctly as:
-- TITANIUM CAPITAL LLC --

Signed and Sealed this

Fourth Day of June, 2002

Attest:

Attesting Officer

JAMES E. ROGAN
*Director of the United States Patent and Trademark Office*